US008838062B2

(12) United States Patent
Hokao

(10) Patent No.: US 8,838,062 B2
(45) Date of Patent: Sep. 16, 2014

(54) MOBILE COMMUNICATION TERMINAL, EMERGENCY NOTICE RECEPTION METHOD, AND NON-TRANSITORY COMPUTER READABLE MEDIUM STORING EMERGENCY NOTICE RECEPTION PROGRAM

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 111 days.

(21) Appl. No.: 13/389,055

(22) PCT Filed: Jul. 20, 2010

(86) PCT No.: PCT/JP2010/004644
§ 371 (c)(1),
(2), (4) Date: Feb. 6, 2012

(87) PCT Pub. No.: WO2011/033711
PCT Pub. Date: Mar. 24, 2011

(65) Prior Publication Data
US 2012/0135702 A1 May 31, 2012

(30) Foreign Application Priority Data

Sep. 18, 2009 (JP) ................................ 2009-216776

(51) Int. Cl.
*H04M 11/04* (2006.01)
*H04W 4/22* (2009.01)
*H04W 28/04* (2009.01)
*H04W 76/00* (2009.01)

(52) U.S. Cl.
CPC ............... *H04W 4/22* (2013.01); *H04W 28/04* (2013.01); *H04W 76/007* (2013.01)
USPC ...................... 455/404.1; 455/412.2; 370/474

(58) Field of Classification Search
USPC .......................................... 455/404.1, 404.2
See application file for complete search history.

(56) References Cited

U.S. PATENT DOCUMENTS 7,184,447 B1 2/2007 Koo et al.
2002/0163906 A1 11/2002 Diachina et al.
(Continued)

FOREIGN PATENT DOCUMENTS

CN 1894909 A 1/2007
CN 201204588 Y 3/2009
(Continued)

OTHER PUBLICATIONS

International Search Report of PCT/JP2010/004644 dated Nov. 2, 2010.
(Continued)

*Primary Examiner* — Vladimir Magloire
(74) *Attorney, Agent, or Firm* — Sughrue Mion, PLLC

(57) ABSTRACT

The present invention provides a mobile communication terminal that enables notification of some kind of information regarding an emergency notice to a user when a part of data composing the emergency notice message can be received. The mobile communication terminal operates in compliance with a wireless system of 3GPP standard, and includes a channel evaluation unit 5 or a message evaluation unit 6 that, when a part of a PDU (Protocol Data Unit) is received from a base station among the PDU necessary for generating a Service Data Unit, evaluates at least one of a channel type and a message type of the part of received PDU, and a control unit 7 that notifies the user that the emergency notice is generated when the channel type or the message type evaluated by the channel evaluation unit 5 or the message evaluation unit 6 indicates information regarding the emergency notice.

29 Claims, 9 Drawing Sheets

(56) References Cited

U.S. PATENT DOCUMENTS

| | | |
|---|---|---|
| 2007/0258508 A1 | 11/2007 | Werb et al. |
| 2008/0198796 A1 | 8/2008 | Jen |
| 2008/0298325 A1 | 12/2008 | Vujcic |

FOREIGN PATENT DOCUMENTS

| | | |
|---|---|---|
| JP | 2003-504942 A | 2/2003 |
| JP | 2004-533164 A | 10/2004 |
| JP | 2007-535203 A | 11/2007 |
| JP | 2008-206157 A | 9/2008 |
| JP | 2009-506709 A | 2/2009 |
| JP | 2009-124596 A | 6/2009 |
| WO | 2008/002810 A2 | 1/2008 |
| WO | WO 2008/069245 A1 | 6/2008 |
| WO | WO 2008/070668 A2 | 6/2008 |
| WO | WO 2008/105419 A1 | 9/2008 |
| WO | 2009/004824 A1 | 1/2009 |

OTHER PUBLICATIONS

Office Action, dated Nov. 8, 2013, issued by the State Intellectual Property Office of the People's Republic of China, in counterpart Application No. 201080041353.6.

MOBILE COMMUNICATION TERMINAL, EMERGENCY NOTICE RECEPTION METHOD, AND NON-TRANSITORY COMPUTER READABLE MEDIUM STORING EMERGENCY NOTICE RECEPTION PROGRAM

CROSS REFERENCE TO RELATED APPLICATIONS

This application is a National Stage of International Application No. PCT/JP2010/004644 filed Jul. 20, 2010, claiming priority based on Japanese Patent Application No. 2009-216776 filed Sep. 18, 2009, the contents of all of which are incorporated herein by reference in their entirety.

TECHNICAL FIELD

The present invention relates to a mobile communication terminal, an emergency notice reception method, and a non-transitory computer readable medium storing an emergency notice reception program.

BACKGROUND ART

As disclosed in PTL 1, Japanese Unexamined Patent Application Publication No. 2009-124596 "Emergency information distribution system, emergency information distribution method, transmission server, and mobile terminal", the present emergency notice (earthquake notification etc.) is distributed to mobile communication terminals from a base station using CBS (Cell Broadcast Service; 3GPP (3rd Generation Partnership Project) standard TS23.041, TS25.324). FIG. 8 is an explanatory view explaining a mechanism of the present emergency notice for mobile communication terminals. As shown in FIG. 8, the mobile communication terminal receives PDU (Protocol Data Unit; 3GPP standard TS25.322) of CTCH transmitted from a predetermined period from the base station as CTCH (Common Traffic Channel) reception period, connects the received PDU, for example PDU1, PDU2 and PDU3, and generates SDU (Service Data Unit) which is a message from the base station. Further, the mobile communication terminal analyzes SDU (Service Data Unit: content), and when it is an emergency notice message, notifies the emergency notice message to the mobile communication terminal users by a message screen display, an alarm tone, or the like.

CITATION LIST

Patent Literature

PTL 1: Japanese Unexamined Patent Application Publication No. 2009-124596 (pages 6 to 10)

SUMMARY OF INVENTION

Technical Problem

However, when the present mechanism of the emergency notice for mobile communication terminals is used, as shown in FIG. 9, at the time a factor for disturbing the reception of CTCH such as monitoring of an incoming signal and base station search is generated, all PDUs (for example, PDU1, PDU2, and PDU3) necessary for generation of SDU cannot be received. When reception of PDU2 fails, for example, SDU which connects all PDU1, PDU2, and PDU3 cannot be generated. Therefore, a problem occurs in which the mobile communication terminal cannot notify any information regarding the emergency notice to users. FIG. 9 is an explanatory view for explaining the problem of the present mechanism of the emergency notice for mobile communication terminals. Usually, the emergency notice message is retransmitted by the base station, however when the emergency notice message by retransmission is received, notification of the emergency notice message to the users is delayed, and in the case of the content that especially requires urgency like an evacuation directive by an earthquake, this can be a fatal problem.

Here, although the factor to disturb the reception of CTCH in the mobile communication terminal depends on the capability of the mobile communication terminal, there are; monitor of an incoming signal (Paging occasions; 3GPP standard TS25.304), search for a base station to select an optimal base station (Cell search; 3GPP standard TS25.304), reception of broadcast information (BCCH: Broadcast Control Channel; 3GPP standard TS25.304), base station reselection (Cell reselection; 3GPP standard TS25.304), location registration (Location registration; 3GPP standard TS25.304), transmission by a user operation (start of a telephone call, packet communication, etc.), power off of the mobile communication terminal by a user operation or a battery capacity drop, and reception failure by deterioration of wireless environment (weak electric field), and any of them is phenomenon generated asynchronously with the reception period of CTCH, thus the present mechanism of the mobile communication terminal cannot be avoided.

(The Purpose of the Present Invention)

The present invention is made in order to solve the above problem, and a purpose thereof is to provide a mobile communication terminal, an emergency notice reception method, and a non-transitory computer readable medium storing an emergency notice reception program that, in the CTCH reception method for CBS (Cell Broadcast Service) of the mobile communication terminal, when even a part of data necessary for notifying the emergency notice message cannot be received, improve the problem in the present technique in which even an absence or receipt of the emergency notice message cannot be notified, and when a part of data composing the emergency notice message can be received, enable timely notification of some kind of information regarding the emergency notice to mobile communication terminal users.

Solution to Problem

In order to solve the abovementioned issue, a mobile communication terminal, an emergency notice reception method, and a non-transitory computer readable medium storing the emergency notice reception program have following characteristic configuration.

A first exemplary aspect of the present invention is a mobile communication terminal operates in compliance with a wireless system of 3GPP standard that includes an evaluation means that, when a part of a PDU (Protocol Data Unit) is received from a base station among the PDU necessary for generation of an SDU (Service Data Unit), evaluates at least one type content between a channel type and a message type of the part of received PDU, and a control means that, when the channel type or the message type evaluated by the evaluation means indicates information regarding an emergency notice, notifies a user that the emergency notice is generated.

A second exemplary embodiment of the present invention is an emergency notice reception method in a mobile communication terminal that operates in compliance with a wireless system of 3GPP standard that includes receiving a part of a PDU (Protocol Data Unit) among the PDU necessary for generation of an SDU (Service Data Unit), evaluating at least one of a channel type and a message type of the part of received PDU, and when the evaluated channel type or the message type indicates information regarding an emergency notice, notifying a user that the emergency notice is generated.

A third exemplary aspect of the present invention is a non-transitory computer readable medium storing an emergency notice reception program that causes a computer to execute a step of, in a mobile communication terminal that operates in compliance with a wireless system of 3GPP standard, when a part of a PDU (Protocol Data Unit) is received among the PDU (Protocol Data Unit) necessary for generation of an SDU (Service data Unit), and a channel type of the part of received PDU is an emergency notice message from a base station, notifying a user that the emergency notice is generated.

Advantageous Effects of Invention

According to the mobile communication terminal, the emergency notice reception method, and the non-transitory computer readable medium storing the emergency notice reception program, following exemplary advantages can be achieved.

A user of the mobile communication terminal is able to know some kind of information regarding the emergency notice when a part of data composing the emergency notice message can be received by the mobile communication terminal. Further, when the emergency notice is generated, by removing the factor that disturbs the reception of data necessary for the notification of the emergency notice message, the emergency notice message from the base station can be received faster.

DESCRIPTION OF EMBODIMENTS

Hereinafter, a preferable exemplary embodiment of a mobile communication terminal, an emergency notice reception method, and an emergency notice reception program, and a program recording medium is explained with reference to the attached drawings. Note that the following explanation explains the mobile communication terminal and the emergency notice reception method according to the present invention, however it is needless to say that the emergency notice reception method may be conducted as the emergency notice reception program that can be executed by a computer, or the emergency notice reception program can be recorded on a recording medium that can be read by a computer.

(The Feature of the Present Invention)

In advance of explanation of the exemplary embodiment of the present invention, an overview of the features of the present invention is explained first. The present invention enables notification of an absense or existence of an emergency notice and an overview thereof as long as a part of PDU (Protocol Data Unit) can be received even when a CTCH reception disturbing factor is generated by improving the problem in the present technique in a CTCH (Common Traffic Channel) reception method for CBS (Cell Broadcast Service) of the mobile communication terminal that operates in compliance with the wireless system of the 3GPP standard. Further, a main feature is to enable reception of all PDUs necessary for generation of SDU (Service Data Unit) by controlling to eliminate the CTCH reception disturbing factor when the emergency notice is generated, and timely notification of the emergency notice message to the mobile communication terminal user. Note that the mechanism according to the present invention can be applied to services other than CBS (Cell Broadcast Service), channels other than CTCH, and contents other than the emergency notice message as long as it is the communication mode that adopts the reception method of signals composed of the protocol configuration similar to the communication protocol in compliance with the wireless system of the 3GPP standard applied in the present invention.

(Explanation of a Configuration Example of the Exemplary Embodiment)

Figure 1:
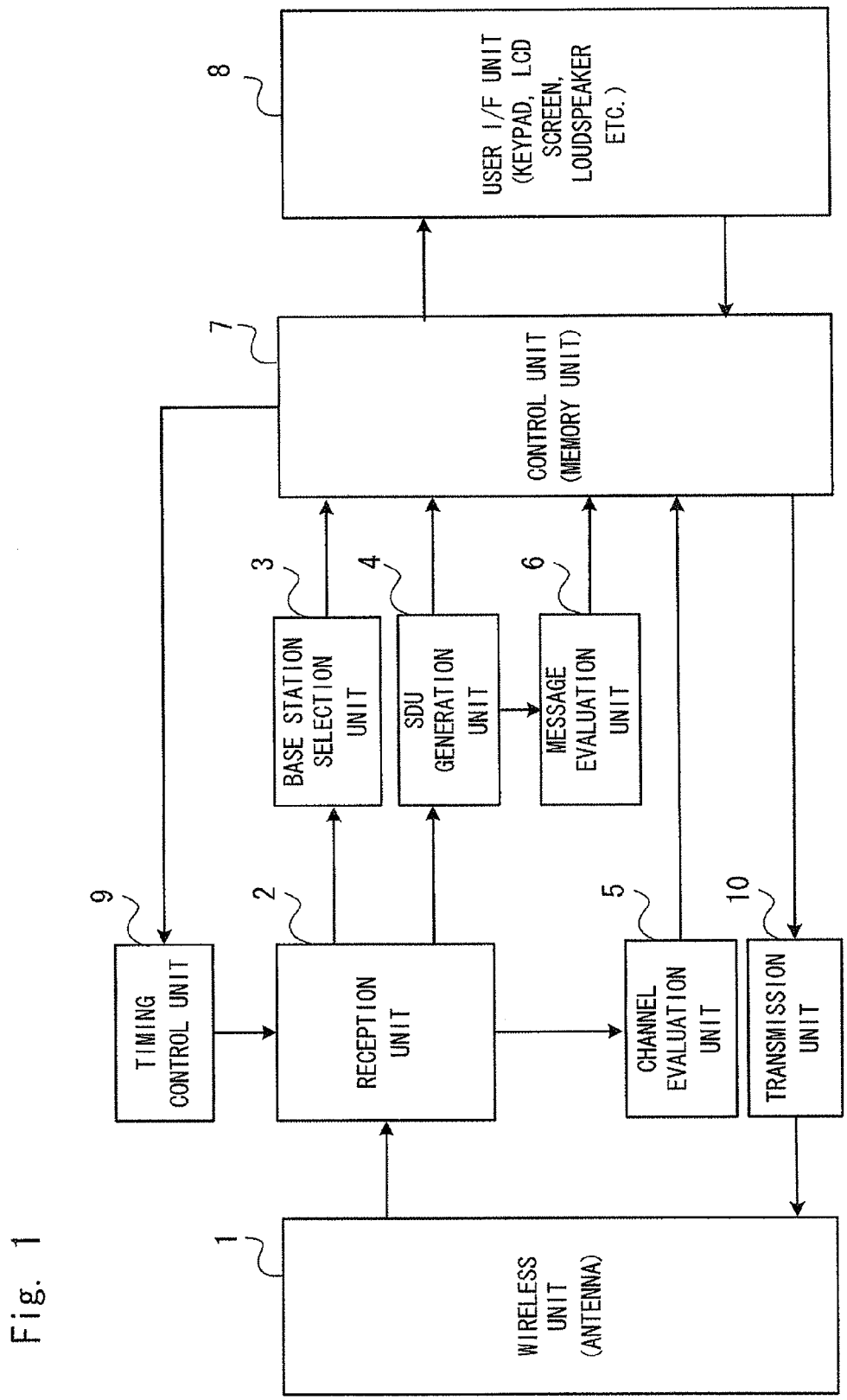
FIG. 1 is a block diagram showing an example of a block configuration of a mobile communication terminal according to the present invention.

Next, an example of a block configuration of the mobile communication terminal according to the present invention is explained using FIG. 1. FIG. 1 is a block configuration diagram showing an example of the block configuration of the mobile communication terminal according to the present invention.

The mobile communication terminal shown in FIG. 1 is a terminal that operates according to the wireless system in compliance with the 3GPP standard, and at least includes a wireless unit 1, a reception unit 2, a base station selection unit 3, an SDU generation unit, a channel evaluation unit 5, a message evaluation unit 6, a control unit 7, a user I/F (Interface) unit 8, a timing control unit 9, and a transmission unit 10.

The wireless unit 1 transmits and receives wireless signals to and from a base station via an antenna according to the wireless system in compliance with the 3GPP standard. The reception unit 2 performs monitoring of an incoming signal, search for the base station, reception of broadcast information, and reception of user data (including PDU of CTCH for an emergency notice) and control data.

The base station selection unit 3 performs evaluation of the base station selection from a result of the base station search and the broadcast information. The SDU generation unit 4 connects PDU regarding the user data and the control data and generates SDU. The channel evaluation unit 5 evaluates a channel type of PDU received by the reception unit 2. The message evaluation unit 6 evaluates a message type from SDU (or a part of PDU received by the reception unit 2) that is generated by the SDU generation unit 4.

The control unit 7 includes a memory unit that stores a program and information, and performs various controls regarding the mobile communication terminal. For example, the base station is (re)selected by the evaluation result of the base station selection by the base station selection unit 3. Further, SDU received by the reception unit 2 is analyzed and a user data process and a control data process are performed. Furthermore, the mobile communication terminal is powered off according to the evaluation of battery capacity drop, the result of the evaluation, and an indication from the user.

Moreover, as for the emergency notice, when the channel type is CTCH, the control unit 7 notifies the user that the emergency notice is generated. When the message type is the emergency notice (such as an earthquake and tsunami), the emergency notice generation or an overview of the emergency notice indicated by the message type is notified to the user. Further, when SDU can be generated, the SDU is analyzed and the emergency notice message distributed from the base station is notified to the user. Furthermore, the processing priority of CTCH reception and various CTCH reception disturbing factors is determined.

The user I/F unit 8 includes a keypad, a LCD (Liquid Crystal Display) screen, a loudspeaker, etc., and notifies the emergency notice to the user by a screen display, an alarm tone, or the like. Additionally, specification by the user is performed for the reception priority processing of the emergency notice message. Then, an indication is performed to transmit by a user operation and power off the mobile communication terminal.

The timing control unit 9 controls a process execution timing between the CTCH reception process and each process to be various CTCH reception disturbing factors. The transmission unit 10 performs transmission of user data and control data.

(Explanation of the Operation of the Exemplary Embodiment)

Next, an example of the operation of the mobile communication terminal illustrated in FIG. 1 is explained.

Figure 2:
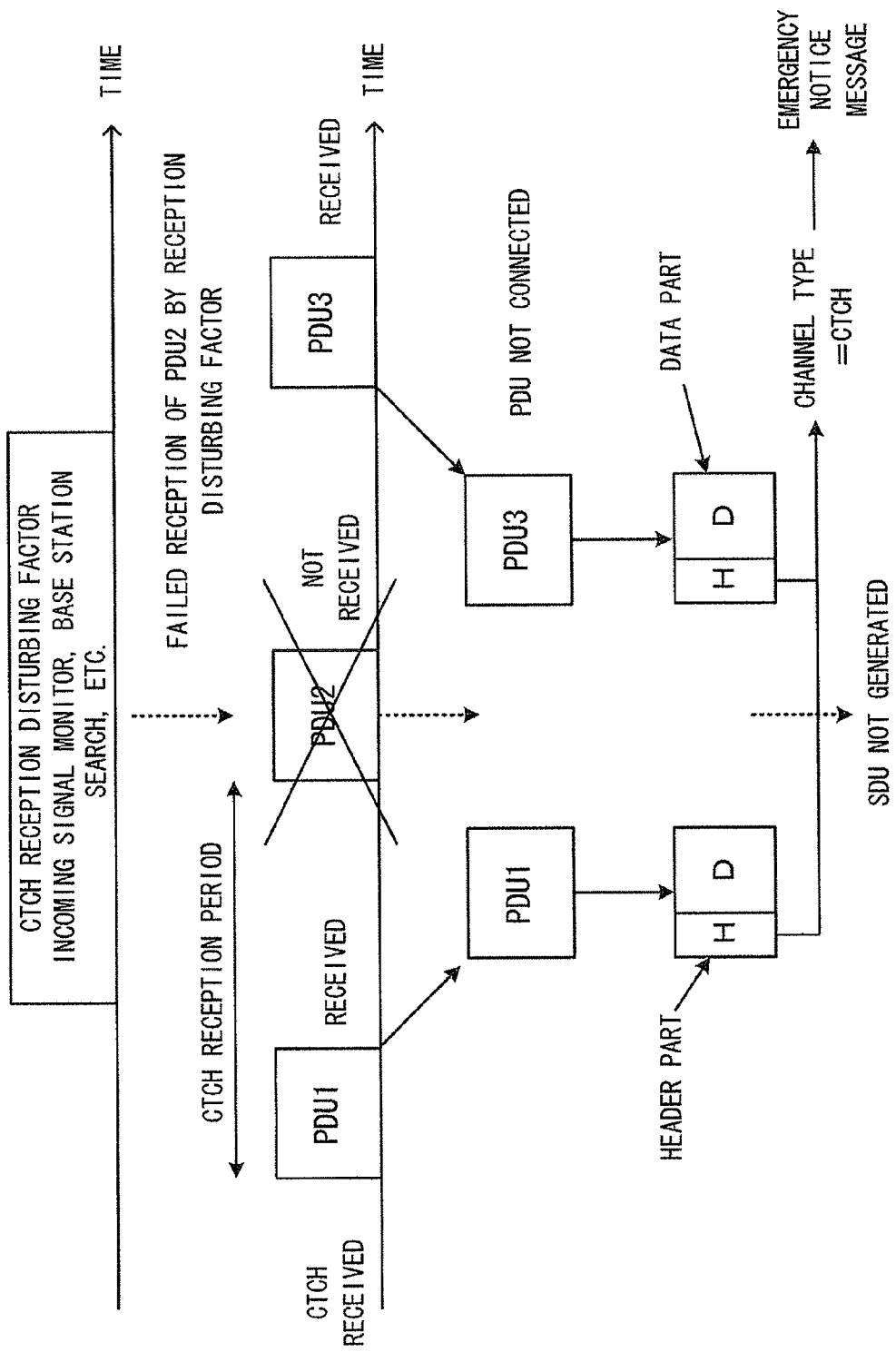
FIG. 2 is an explanatory view explaining an example of an operation for notifying that an emergency notice is generated according to an evaluation of a channel type.

(1) Notification that the Emergency Notice is Generated by the Evaluation of the Channel Type (FIG. 2)

FIG. 2 is an explanatory view explaining an example of the operation for notifying the emergency notice message to the user according to the evaluation of the channel type, and explains the example of the operation by the control unit 7 for notifying that the emergency notice is generated to the user according to the evaluation result of the channel type of the received PDU by the channel evaluation unit 5.

As shown in FIG. 2, among PDUs (PDU1, PDU2, PDU3, . . . ) transmitted from the base station for every predetermined certain CTCH reception period, when, for example, reception of PDU2 fails due to the generation of the CTCH reception disturbing factor such as incoming signal monitor and base station search, a situation occurs in which PDUs cannot be connected and SDU cannot be generated.

As described so far, when the factor to disturb the reception of CTCH is generated in the mobile communication terminal, the reception unit 2 fails to receive PDU2, and cannot receive all PDUs necessary for generation of SDU, however as shown in FIG. 2, the channel type of a part of the received PDUs (PDU1 and PDU3) is analyzed by the channel evaluation unit 5, and when the channel type of PDU is CTCH, the control unit 7 notifies the user that the emergency notice is generated. In this case, SDU generation unit 4 cannot generate SDU. Therefore, the control unit 7 cannot display the emergency notice message distributed from the base station on a screen, but can draw the mobile communication terminal user's attention by displaying on the screen that the emergency notice is generated and sounding an alarm tone.

Note that as a method for the channel evaluation unit 5 to analyze the channel type, as shown in FIG. 2, the channel type can be evaluated as CTCH by TCTF (Target Channel Type Field; 3GPP standard TS25.321) on MAC Header in PDU.

Figure 3:
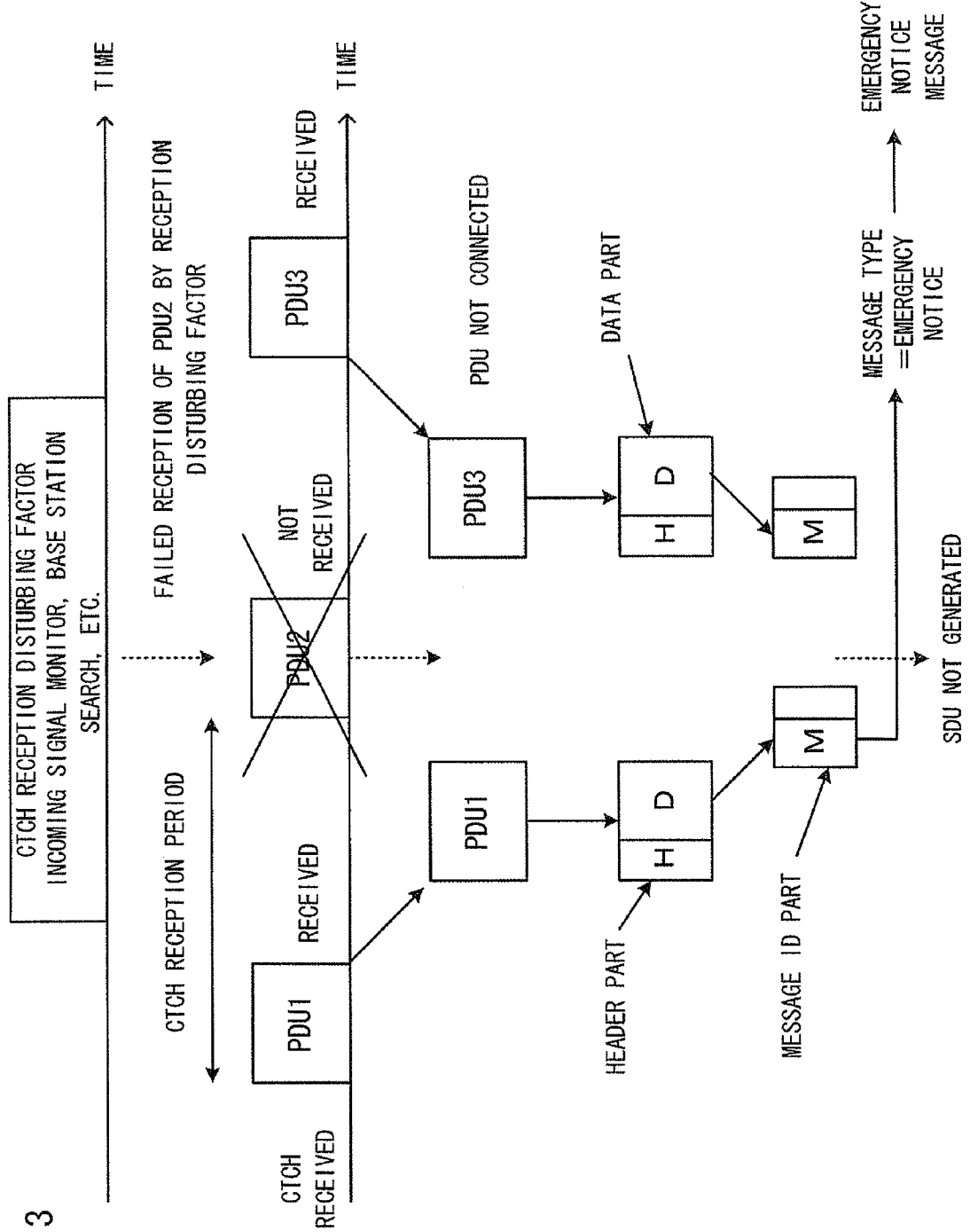
FIG. 3 is an explanatory view explaining an example of an operation for notifying that an emergency notice is generated or an overview of the emergency notice according to an evaluation of a message type.

(2) Notification that the Emergency Notice is Generated or the Overview of the Emergency Notice by the Evaluation of the Message Type (FIG. 3)

FIG. 3 an explanatory view explaining an example of the operation for notifying that the emergency notice is generated or the overview of the emergency message indicated by the message type according to the evaluation of the message type, and explains the example of the operation by the control unit 7 for notifying the user that the emergency notice is generated or the overview of the emergency notice (type such as an earthquake and tsunami) according to the evaluation result by the message evaluation unit 6 from a part of the received PDUs.

As shown in FIG. 3, among PDUs (PDU1, PDU2, PDU3, . . . ) transmitted from the base station for every predetermined certain CTCH reception period, when, for example, reception of PDU2 fails due to the generation of the CTCH reception disturbing factor such as incoming signal monitor and base station search, a situation occurs in which PDUs cannot be connected and SDU cannot be generated.

As described so far, when the factor to disturb the reception of CTCH is generated in the mobile communication terminal, the reception unit 2 fails to receive PDU2, and cannot receive all PDUs necessary for generation of SDU, however as shown in FIG. 3, the message type is analyzed by the message evaluation unit 6 using a part of the received PDUs (PDU1 and PDU3), and when the message type of PDU is the emergency notice, the control unit 7 notifies the user that the emergency notice is generated or the overview of the emergency notice indicated by the message type (type such as an earthquake and tsunami). At this time, SDU generation unit 4 cannot generate SDU. Therefore, the control unit 7 cannot display the emergency notice message distributed from the base station on a screen, but can draw the mobile communication terminal user's attention by displaying on the screen that the emergency notice is generated and sounding an alarm tone.

Note that as the method for the message evaluation unit 6 to analyze the message type, as shown in FIG. 3, the message type can be evaluated as the emergency notice by a Message ID (3GPP standard TS25.324) in a CB (Cell Broadcast) message in PDU. Further, Although it depends on the operation of a mobile communication provider, as the overview of the emergency notice (such as an earthquake and tsunami) can be evaluated from the message type, it is possible to specifically draw the mobile communication terminal user's attention by displaying it on a screen or sounding an alarm tone.

Figure 4:
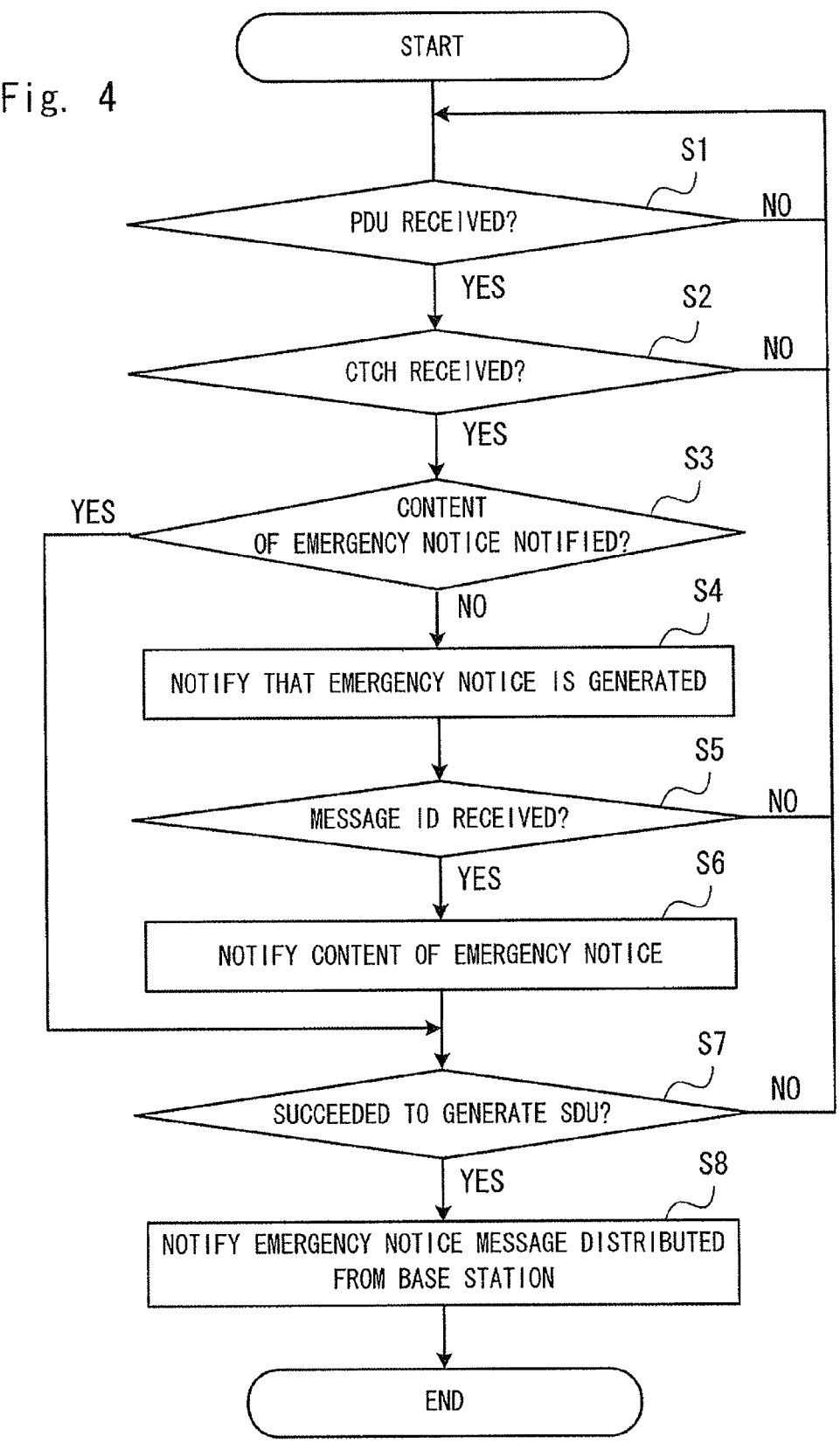
FIG. 4 is a flowchart explaining an example of an operation for gradually notifying the emergency notice to the user according to the evaluation of the channel type and the message type.

(3) Gradual Notification of the Emergency Notice (FIG. 4)

FIG. 4 is a flowchart explaining an example of the operation for gradually notifying the user of the emergency notice (that the emergency notice is generated, the overview of the emergency notice, and the emergency notice message from the base station) according to the evaluation of the channel type and the message type. Specifically, it explains the example of the operation by the control unit 7 for gradually notifying the user of the emergency notice (that the emergency notice is generated, the overview of the emergency notice, and the emergency notice message from the base station) according to the evaluation result by the channel evaluation unit 5 or the message evaluation unit 6 using a part of the received PDUs.

In the flowchart of FIG. 4, firstly it is confirmed whether or not the reception unit 2 received PDU from the base station (step S1), when it is received (YES in the step S1), then the channel evaluation unit 5 evaluates whether or not the channel type of the received PDU is CTCH (step S2). When the channel type is CTCH (YES in the step S2), it is evaluated whether or not the emergency notice generation regarding the CTCH is already notified (step S3). When it is already notified (YES in the step S3), it moves to the process of the step S7, however when it is not already notified (NO in the step S3), the message that the emergency notice is generated by the evaluation of the channel type explained in FIG. 2 of the abovementioned (1) is notified to the user (step S4).

After that, the message evaluation unit 6 evaluates whether or not the message type of the received PDU is the emergency notice (step S5), and when it is the emergency notice (YES in the step S5), a message indicating the overview of the emergency notice (such as an earthquake and tsunami) by the evaluation of the message type explained in FIG. 3 of the above-mentioned (2) is notified to the user (step S6). Lastly, it is evaluated whether or not all PDUs necessary for generation of SDU are received and the SDU generation unit 4 succeeded to generate SDU (step S7), when the generation of SDU fails (NO in the step S7), it returns to the step S1, and the abovementioned operation is repeated. When generation of SDU is succeeded (YES in the step S7), the emergency notice message distributed from the base station by the SDU is notified to the user (step S8).

As described so far, the evaluation of the channel type by the channel evaluation unit 5 in the abovementioned (1) can be performed as long as one of PDU among SDU composing the emergency notice message distributed from the base station can be received, thus it is possible to notify the mobile communication terminal user that the emergency notice is generated fastest. Moreover, the evaluation of the message type by the message evaluation unit 6 in the abovementioned (2) requires to receive PDU including the Message ID in SDU, which is the CB message, however more specific overview of the emergency notice (that an earthquake, tsunami or the like occurred) than the abovementioned (1) can be notified.

That is, the mobile communication terminal can notify necessary information for the mobile communication terminal user faster by gradually operating the mechanisms of the abovementioned (1) and (2). First, when it is evaluated that CTCH is received by the evaluation of the channel type by the channel evaluation unit 5 in (1), the control unit 7 draws the mobile communication terminal user's attention by promptly displaying that the emergency notice is generated on a screen or sounding an alarm tone. Next, when the overview of the emergency notice (such as an earthquake and tsunami) can be evaluated by the evaluation of the message type by the message evaluation unit 6 in (2), the control unit 7 draws the mobile communication terminal user's attention more specifically by promptly displaying it on a screen or sounding an alarm tone.

Lastly, when all the necessary PDUs are received and SDU can be generated by the SDU generation unit 4, the control unit 7 analyzes the generated SDU and notifies the mobile communication terminal user the emergency notice message (such as a screen display and an alarm tone) distributed from the base station. Note that until the last emergency notice message is notified, as described above, the mechanism of (1) is combined with the mechanism of (2), and it may be gradually notified, or only the mechanism of (1) or the mechanism of (2) may be applied.

(4) Reception Priority Process of the Emergency Notice Message

When the emergency notice is generated, that is, after the process of gradual notification regarding the emergency notice of FIG. 4 is started (specifically, after at least one PDU of CTCH is received or after PDU of CTCH whose message type is the emergency notice is received), it is desirable to remove the factor to disturb the reception of CTCH such as incoming signal monitor and base station search and notify the mobile communication terminal user of the emergency notice message distributed from the base station as soon as possible.

Hereinafter, a process to eliminate the CTCH reception disturbing factor in the mobile communication terminal and preferentially receive the emergency notice message from the base station is explained for each factor.

Figure 5:
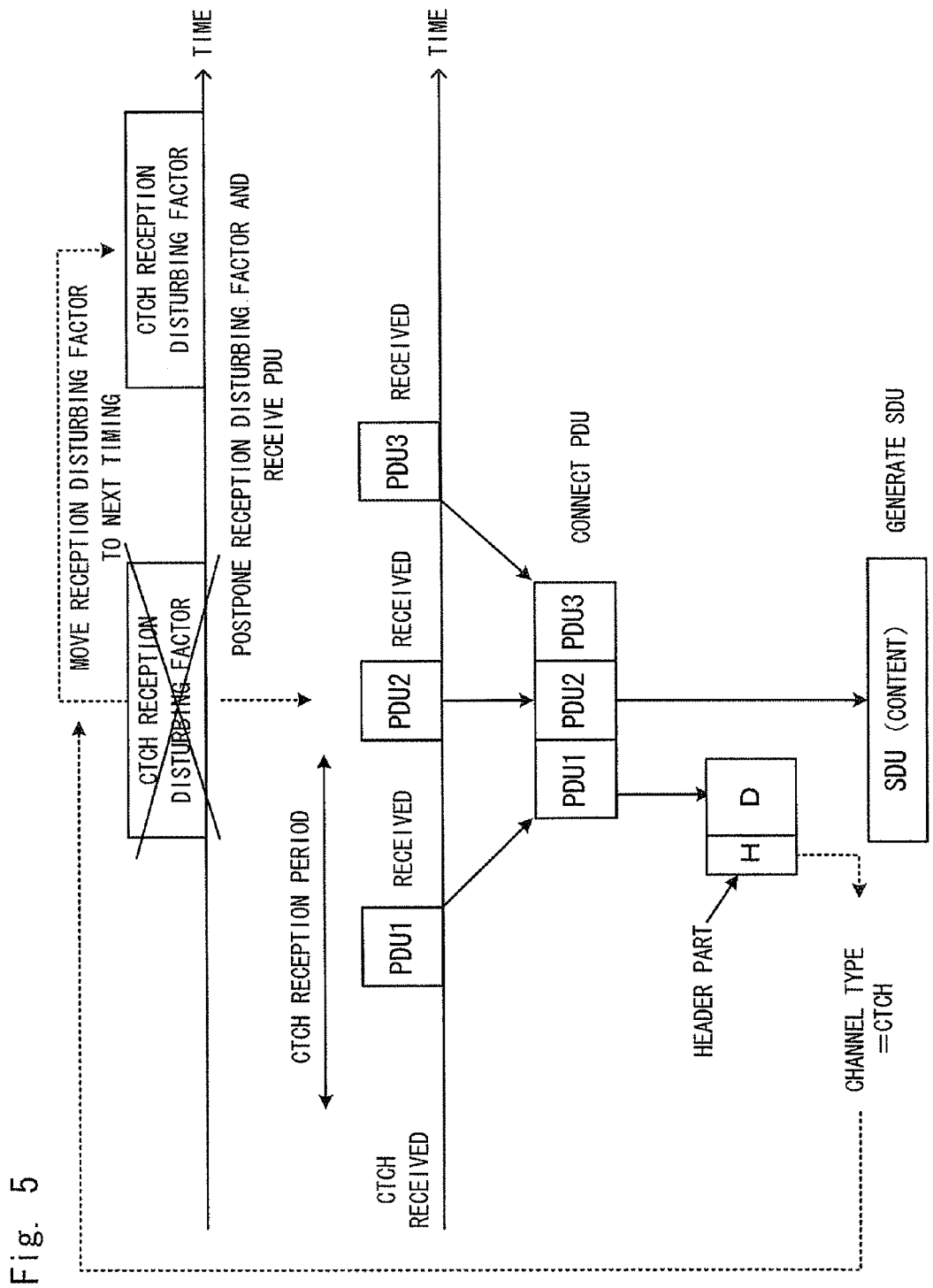
FIG. 5 is an explanatory view explaining an example of an operation for prioritizing a process to receive remaining PDU of CTCH necessary for generation of SDU of an emergency notice message over a monitoring (Paging occasions) process of an incoming signal and a reception process of broadcast information.

(4-1) Monitoring an Incoming Signal (Paging Occasions; 3GPP Standard TS25.304) (FIG. 5)

FIG. 5 is an explanatory view explaining an example of the operation for prioritizing the process of receiving remaining PDU of CTCH necessary for generation of SDU of the emergency notice message over the monitoring of the incoming signal (Paging occasions) process and the reception process of the broadcast information, and explains an example of the operation in which after at least one PDU of CTCH is received or PDU of CTCH whose message type is the emergency notice is received, when the next CTCH reception timing is the same time as the timing of the monitoring (Paging occasions) and the reception process of the broadcast information, the control unit 7 postpones the monitoring (Paging occasions) process and the reception process of the broadcast information to the next monitoring (Paging occasions) process and the reception process of the broadcast information, and preferentially receive CTCH.

As shown in FIG. 5, among PDUs (PDU1, PDU2, PDU3, . . . ) transmitted from the base station for every predetermined certain CTCH reception period, for example after PDU1 whose channel type is CTCH is received, when the CTCH reception disturbing factor such as the monitoring of the incoming signal (Paging occasions) process and the reception process of the broadcast information is generated at the timing when the reception process of the next PDU2 is performed, the monitoring of the incoming signal (Paging occasions) and the reception process of the broadcast information, which are to be the CTCH reception disturbing factors, are postponed to the next timing. As a result, since PDU2 can be preferentially received, all PDUs (PDU1, PDU2, and PDU3) necessary for generation of SDU (content) of the emergency notice message can be received, all PDUs (PDU1, PDU2, and PDU3) can be connected, and SDU can be generated.

As described so far, after at least one PDU of CTCH is received or after PDU of CTCH whose message type is the emergency notice is received, as shown in FIG. 5, by the control of the control unit 7, the process to receive remaining PDU of CTCH necessary for generation of SDU of the emergency notice message is prioritized over the monitoring of the incoming signal (Paging occasions) process, which is the CTCH reception disturbing factor. That is, when the next CTCH reception timing is the same time as the timing of monitoring of the incoming signal (Paging occasions), the control unit 7 postpones the monitoring of the incoming signal (Paging occasions) process to the next monitoring of the incoming signal (Paging occasions) timing, and preferentially receives CTCH.

Note that although the 3GPP standard specifies that the monitoring of the incoming signal (Paging occasions) process may be prioritized over the reception of CTCH, in this exemplary embodiment that prioritize the reception process of the emergency notice message from the base station, it is conversely controlled to prioritize the reception of CTCH over the monitoring of the incoming signal (Paging occasions) process.

Figure 6:
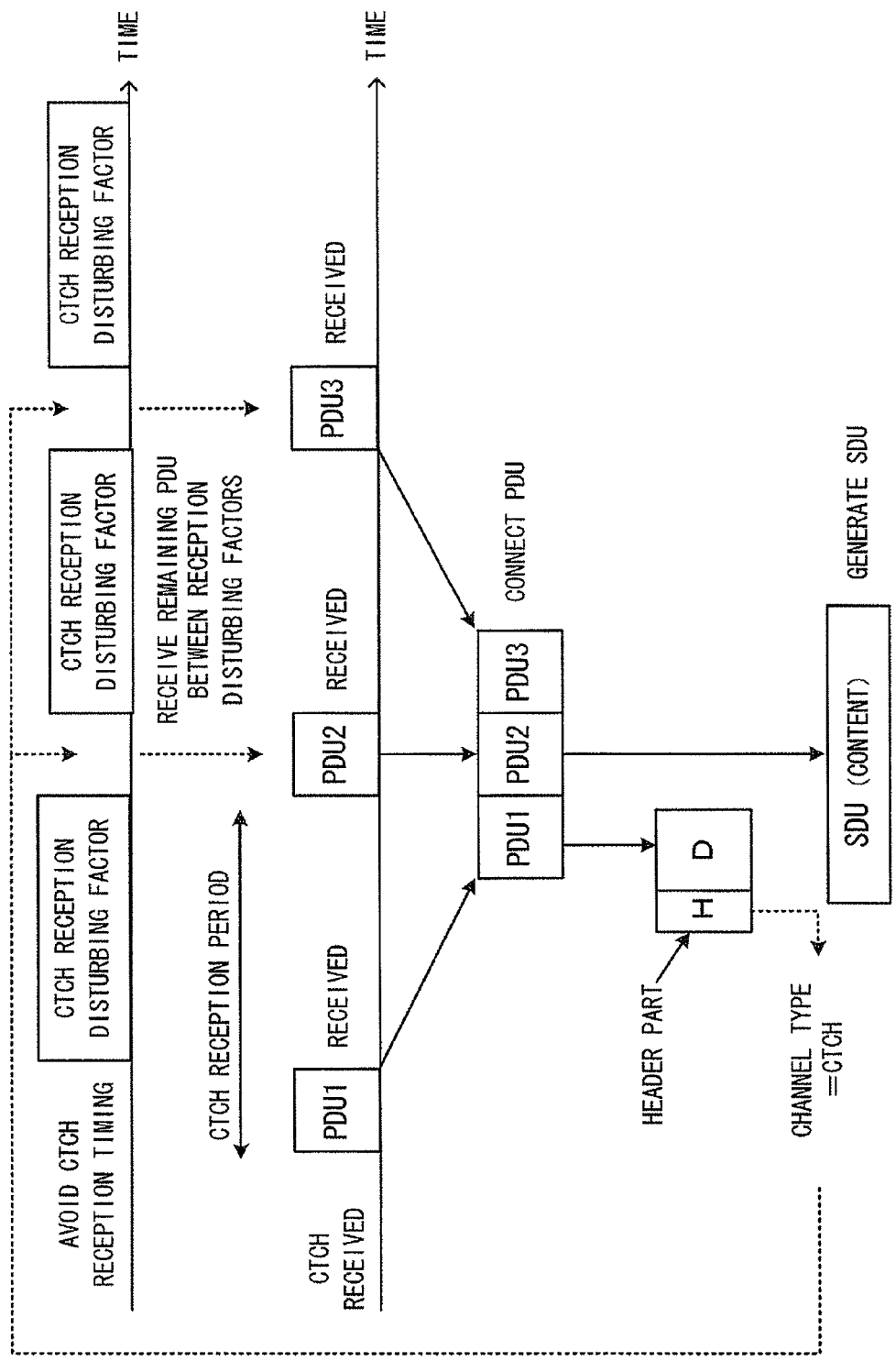
FIG. 6 is an explanatory view explaining an example of an operation for prioritizing the process to receive remaining PDU of CTCH necessary for generation of SDU of the emergency notice message over a search of a base station (Cell search) process for selecting an optimal base station.

(4-2) Search for the Base Station (Cell Search; 3GPP Standard TS25.304) (FIG. 6) for Selecting the Optimal Base Station FIG. 6 is an explanatory view explaining an example of the operation for prioritizing the process to receive remaining PDU of CTCH necessary for generation of SDU of the emergency notice message over the search for the base station (Cell search) process for selecting the optimal base station. It explains an example of the operation by the control unit 7 that, after at least one PDU of CTCH is received or after PDU of CTCH whose message type is the emergency notice is received, performs the search process of the base station for selecting the optimal base station avoiding the CTCH reception timing and always receive CTCH preferentially at the CTCH reception timing.

As shown in FIG. 6, among PDUs (PDU1, PDU2, PDU3, . . . ) transmitted from the base station for every predetermined certain CTCH reception period, for example after PDU1 whose channel type is CTCH is received, at the timing to perform the reception process of the next PDU2, when the CTCH reception disturbing factor such as the base station search (Cell search) process is generated, it is controlled to perform the base station search (Cell search) etc., which is to be the CTCH reception disturbing factor, avoiding the CTCH reception timing, and to always receive PDU of CTCH between the CTCH reception disturbing factors. As a result, since PDU2 can be received preferentially, all PDUs (PDU1, PDU2, and PDU3) necessary for generation of SDU (content) of the emergency notice message can be received, all PDUs (PDU1, PDU2, and PDU3) can be connected, and SDU can be generated.

As described so far, after the mobile communication terminal receives at least one PDU of CTCH or PDU of CTCH whose message type is the emergency notice, as shown in FIG. 6, by the control of the control unit 7, the process to receive remaining PDU of CTCH necessary for generation of SDU of the emergency notice message is prioritized over the process of base station search for selecting the optimal base station, which is the CTCH reception disturbing factor. That is, the process of base station search for selecting the optimal base station is performed avoiding the CTCH reception timing, and it is controlled to always receive CTCH preferentially at the CTCH reception timing.

(4-3) Reception of the Broadcast Information (BCCH: Broadcast Control Channel; 3GPP Standard TS25.304) (FIG. 5)

The reception process of the broadcast information (BCCH), which is one of the CTCH reception disturbing factors, is similar to the case of monitoring of the incoming signal (Paging occasions) process explained in (4-1), and after the mobile communication terminal receives at least one PDU of CTCH or PDU of CTCH whose message type is the emergency notice, as shown in FIG. 5, by the control of the control unit 7, the process to receive remaining PDU of CTCH necessary for generation of SDU of the emergency notice message is prioritized over the reception process of the broadcast information (BCCH), which is the CTCH reception disturbing factor. That is, when the next CTCH reception timing is the same time as the timing of receiving the broadcast information (BCCH), it is controlled to postpone the process of receiving the broadcast information (BCCH) to the next timing of receiving the broadcast information (BCCH), and preferentially receive CTCH.

Figure 7:
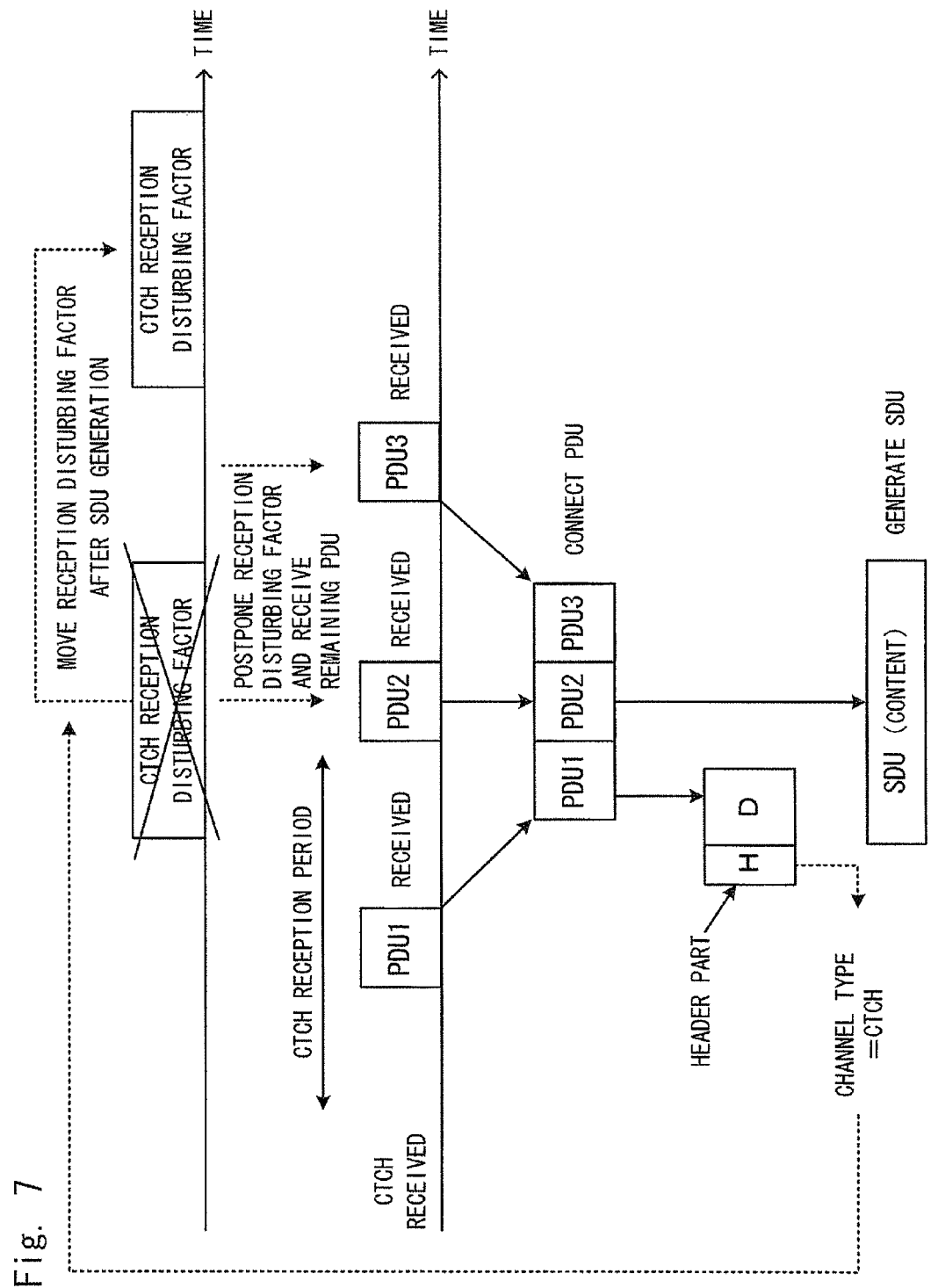
FIG. 7 is an explanatory view explaining an example of an operation for prioritizing the process to receive remaining PDU of CTCH necessary for generation of SDU of the emergency notice message over a base station reselection (Cell reselection) process, a location registration process, a process of transmission by a user operation, and a process of power off.
Figure 8:
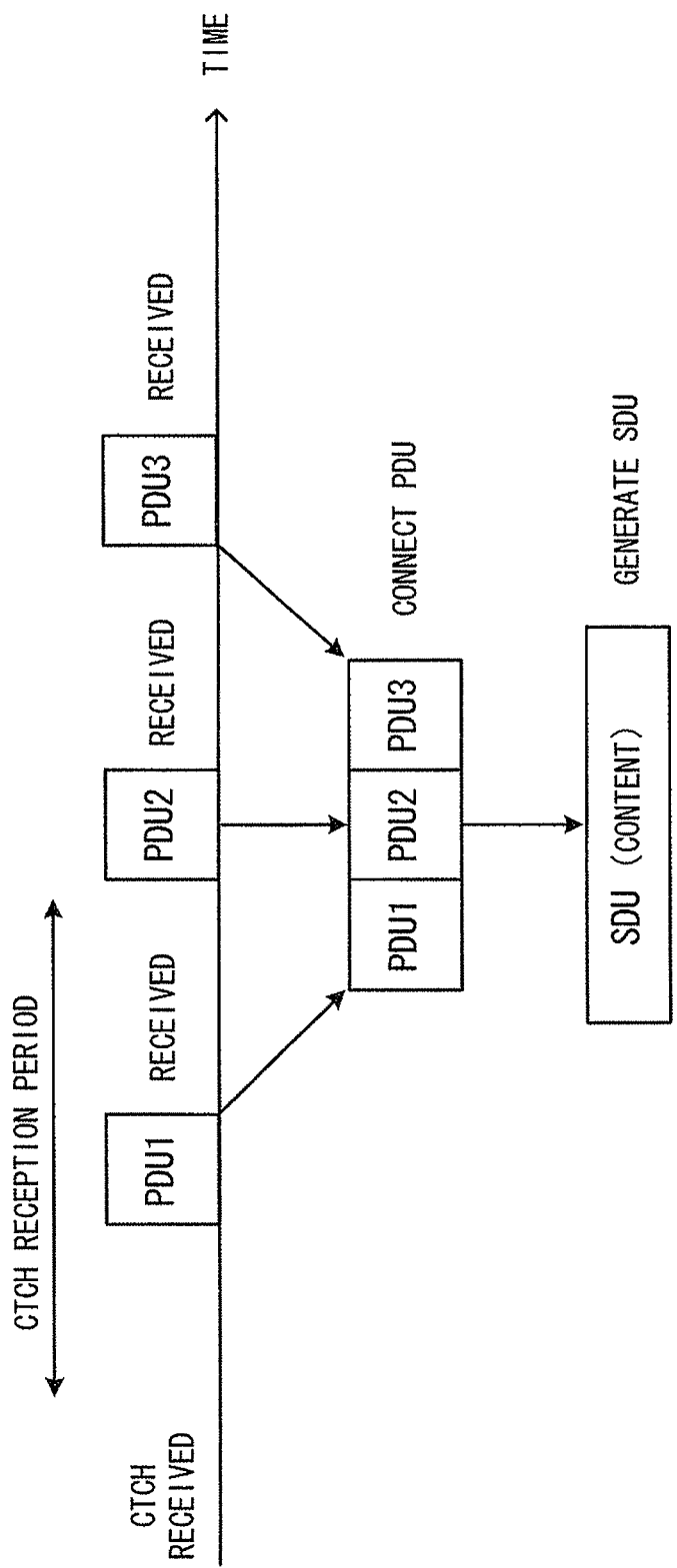
FIG. 8 is an explanatory view explaining a present mechanism of an emergency notice for mobile communication terminals.
Figure 9:
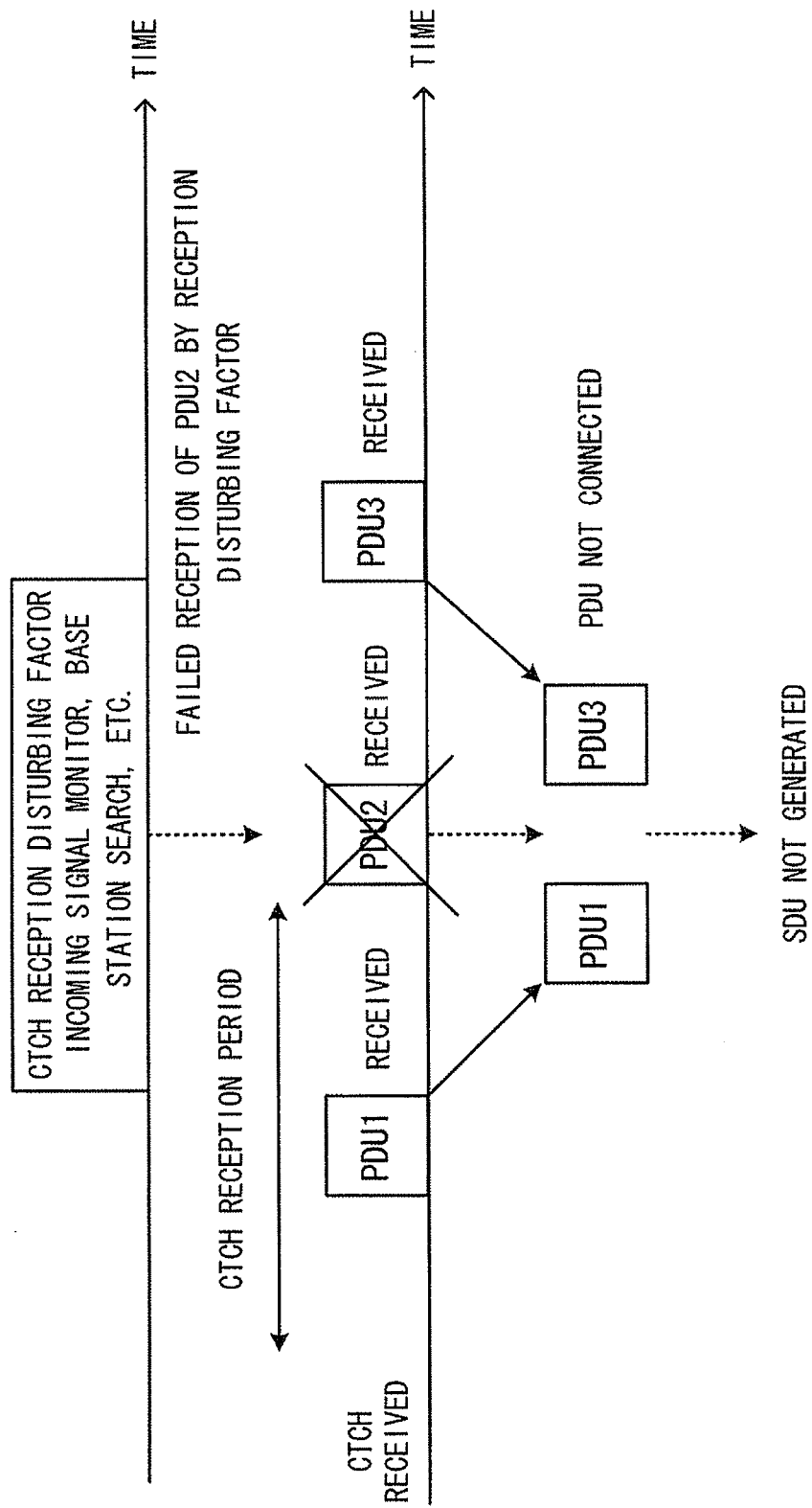
FIG. 9 is an explanatory view for explaining a problem of the present mechanism of the emergency notice for mobile communication terminals.

(4-4) Base Station Reselection (Cell Reselection; 3GPP Standard TS25.304) (FIG. 7)

FIG. 7 is an explanatory view explaining an example of the operation for prioritizing the process to receive remaining PDU of CTCH necessary for generation of SDU of the emergency notice message over the base station reselection (Cell reselection) process, the location registration (Location registration) process, the process of transmission by a user operation, and the process of power off. It explains an example of the operation in which after at least one PDU of CTCH is received or PDU of CTCH whose message type is the emergency notice is received, the control unit 7 performs the base station reselection (Cell reselection) process, the location registration (Location registration) process, the process of transmission by the user operation, and the process of power off by a user operation or a battery capacity drop after generation of SDU (notification of the emergency notice message distributed from the base station) is completed, and always receive CTCH at the CTCH reception timing.

As shown in FIG. 7, among PDUs (PDU1, PDU2, PDU3, . . . ) transmitted from the base station for every predetermined certain CTCH reception period, for example after PDU1 whose channel type is CTCH is received, at the timing to perform the reception process of the next PDU2, when the CTCH reception disturbing factor such as the base station reselection (Cell reselection) process is generated, it is controlled to postpone the base station reselection (Cell reselection) etc., which is to be the CTCH reception disturbing factor, after generation of SDU, and avoid the timings to receive all PDUs necessary for SDU generation. As a result, since PDU2 can be preferentially received, all PDUs (PDU1, PDU2, and PDU3) necessary for generation of SDU (content) of the emergency notice message can be received, all PDUs (PDU1, PDU2, and PDU3) can be connected, and SDU can be generated.

As described so far, after the mobile communication terminal receives at least one PDU of CTCH or PDU of CTCH whose message type is the emergency notice, as shown in FIG. 7, by the control of the control unit 7, the process to receive remaining PDU of CTCH necessary for generation of SDU of the emergency notice message is prioritized over the base station reselection (Cell reselection) process, which is the CTCH reception disturbing factor. That is, the process of base station reselection (Cell reselection) is performed after the generation of SDU (notification of the emergency notice message distributed from the base station) is completed, and it is controlled to always receive CTCH at the CTCH reception timing.

(4-5) Location Registration (Location Registration; 3GPP Standard TS25.304) (FIG. 7)

The location registration (Location registration) process, which is one of the CTCH reception disturbing factor, is similar to the case of the base station reselection (Cell reselection) process explained in (4-4), and after the mobile communication terminal receives at least one PDU of CTCH or PDU of CTCH whose message type is the emergency notice, as shown in FIG. 7, by the control of the control unit 7, the process to receive remaining PDU of CTCH necessary for generation of SDU of the emergency notice message is prioritized over the process of location registration (Location registration), which is the CTCH reception disturbing factor. That is, the process of location registration (Location registration) is performed after generation of SDU (notification of the emergency notice message distributed from the base station) is completed, and it is controlled to always receive CTCH at the CTCH reception timing.

(4-6) Transmission by the User Operation (Start of a Telephone Call, Packet Communication, etc.) (FIG. 7)

The process regarding the transmission by the user operation, which is one of the CTCH reception disturbing factors, is similar to the case of the base station reselection (Cell reselection) process explained in (4-4), and after the mobile communication terminal receives at least one PDU of CTCH or PDU of CTCH whose message type is the emergency notice, as shown in FIG. 7, by the control of the control unit 7, the process to receive remaining PDU of CTCH necessary for generation of SDU of the emergency notice message is prioritized over the process of transmission, which is the CTCH reception disturbing factor. That is, the process of transmission is performed after generation of SDU (notice of the emergency notice message distributed from the base station) is completed, and it is controlled to always receive CTCH at the CTCH reception timing.

In this case, since the process of transmission by the user operation of the mobile communication terminal is temporarily suspended, it is necessary to include a means to notify a user of that. Note that when the transmission by the user operation is an emergency call, as the transmission itself requires urgency, the reception of the CTCH may be excluded from the above-mentioned process, and the process of transmission by the user operation may be performed even at the CTCH reception timing.

(4-7) Power Off of the Mobile Communication Terminal by the User Operation (FIG. 7)

The process of powering off the mobile communication terminal by the user operation, which is one of the CTCH reception disturbing factors, is similar to the case of the base station reselection (Cell reselection) process explained in (4-4), and after the mobile communication terminal receives at least one PDU of CTCH or PDU of CTCH whose message type is the emergency notice, as shown in FIG. 7, by the control of the control unit 7, the process to receive remaining PDU of CTCH necessary for generation of SDU of the emergency notice message is prioritized over the process of power off by the user operation of the mobile communication terminal, which is the CTCH reception disturbing factor. That is, the process of powering off the mobile communication terminal by the user operation is performed after generation of SDU (notification of the emergency notice message distributed from the base station) is completed, and it is controlled to always receive CTCH at the CTCH reception timing.

In this case, since the process of powering off the mobile communication terminal by the user operation of the mobile communication terminal is temporarily suspended, while notifying it to the user, after the user of the mobile communication terminal confirmed the notification of the emergency notice message distributed from the base station, it is necessary to power off the mobile communication terminal (however in advance of the operation to power off, it is necessary to confirm the user whether or not to power off).

(4-8) Power Off of the Mobile Communication Terminal Due to the Battery Capacity Drop (FIG. 7)

The process of powering off the mobile communication terminal by the battery capacity drop, which is one of the CTCH reception disturbing factors, is similar to the case of the base station reselection (Cell reselection) process explained in (4-4), and after the mobile communication terminal receives at least one PDU of CTCH or PDU of CTCH whose message type is the emergency notice, as shown in FIG. 7, by the control of the control unit 7, the process to receive remaining PDU of CTCH necessary for generation of SDU of the emergency notice message is prioritized over the process to power off the mobile communication terminal by the battery capacity drop, which is the CTCH reception disturbing factor. That is, the process to power off the mobile communication terminal by the battery capacity drop is performed after generation of SDU (notification of the emergency notice message distributed from the base station) is completed, and it is controlled to always receive CTCH at the CTCH reception timing.

In this case, after the user of the mobile communication terminal confirms the notification of the emergency notice message distributed from the base station, it is necessary to power off the mobile communication terminal (however, in advance of the operation of power off, it is necessary to confirm the user whether or not to power off).

(5) Specification by a User Whether or not to Permit the Reception Priority Processing of the Emergency Call Message As for the reception priority process of the emergency notice message from the base station of the abovementioned (4), the user of the mobile communication terminal can arbitrarily specify in advance whether to prioritize the CTCH reception or the process of CTCH reception disturbing factor for each CTCH reception disturbing factor. Further, when it is specified to prioritize the CTCH reception, the user can specify whether to prioritize the CTCH reception after at least one PDU of CTCH is received or prioritize the CTCH reception after PDU of CTCH whose the message type is the emergency notice is received.

Furthermore, after PDU of CTCH whose message type is the emergency notice is received, when the CTCH reception is prioritized, the user can specify whether to prioritize the CTCH reception or the process of the CTCH reception disturbing factor for each message type, that is, the overview of the message type (such as an earthquake and tsunami).

For example, the following setting is possible by arbitrary specification of the user of the mobile communication terminal. (5-1) Prioritize the monitoring of the incoming signal (Paging occasions) (4-1) and emergency call transmission of the user operation (4-6) over the CTCH reception (5-2) Prioritize the CTCH reception over the base station search (Cell search) (4-2) after at least one PDU of CTCH is received (5-3) Prioritize the CTCH reception over the base station reselection (Cell reselection) (4-4) after PDU of CTCH whose message type is the emergency notice (earthquake) is received, however after PDU of CTCH whose message type is the emergency notice (other than earthquake) is received, prioritize the process of base station reselection (Cell reselection) process (Explanation of the Exemplary Advantage of this Exemplary Embodiment)

As explained above in detail, the following exemplary advantages are achieved in this exemplary embodiment. Specifically, when the user of the mobile communication terminal can receive a part of data necessary for the notification of the emergency notice message by the mobile communication terminal, it is possible to know the existence of the emergency message and the overview thereof. Moreover, when the emergency notice is generated, by removing the factor to disturb the reception of data necessary for the notification of the emergency notice message, it is possible to receive the emergency notice message from the base station faster.

Note that as long as it is the communication mode that adopts the reception method of signals composed of the protocol configuration similar to CBS (Cell Broadcast Service) protocol in compliance with 3GPP standard explained in the abovementioned exemplary embodiment, the mechanism according to the present invention can be applied completely in a similar manner to the content other than the channel and emergency notice message disclosed in this exemplary embodiment.

Although the above exemplary embodiment explained the present invention as a configuration of hardware, the present invention is not limited to this. The present invention can be realized by causing a CPU (Central Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention is explained with reference to the exemplary embodiment, the present invention is not limited by above. Various modifications that can be understood by a person in the art within the scope of the present invention can be made to the configurations and details of the present invention.

The present application claims priority rights of and is based on Japanese Patent Application No. 2009-216776 filed on Sep. 18, 2009 in the Japanese Patent Office, the entire contents of which are hereby incorporated by reference.

REFERENCE SIGNS LIST

1 WIRELESS UNIT
2 RECEPTION UNIT
3 BASE STATION SELECTION UNIT
4 SDU GENERATION UNIT
5 CHANNEL EVALUATION UNIT
6 MESSAGE EVALUATION UNIT
7 CONTROL UNIT
8 USER I/F UNIT
9 TIMING CONTROL UNIT
10 TRANSMISSION UNIT

The invention claimed is:

1. A mobile communication terminal that operates in compliance with a wireless system of 3GPP standard, the mobile communication terminal comprising:
an evaluation unit that, when receiving, from a base station, at least one PDU (Protocol Data Unit) that is a part of a SDU (Service Data Unit) which was transmitted as a plurality of PDUs, without receiving all of the plurality of PDUs which are necessary for generation of SDU, evaluates whether or not at least one type content between a channel type and a message type of the at least one received PDU is an emergency notice; and
a control unit that, when the channel type or the message type evaluated by the evaluation unit indicates information regarding the emergency notice, notifies a user that the emergency notice is generated.

2. The mobile communication terminal according to claim 1, wherein the evaluation unit evaluates whether or not the channel type of the at least one received PDU is a CTCH (Common Traffic Channel), which is an emergency notice message from the base station, according to a TCTF (Target Channel Type Field) on a MAC header in the at least one received PDU.

3. The mobile communication terminal according to claim 1, wherein the evaluation unit evaluates whether or not the message type of the at least one received PDU is the emergency notice according to a Message ID in a CB (Cell Broadcast) message in the at least one received PDU.

4. The mobile communication terminal according to claim 1, wherein the control unit notifies the user that the emergency notice is generated by displaying that the emergency notice is generated on a screen or sounding an alarm tone that the emergency notice is generated.

5. The mobile communication terminal according to claim 1, wherein the control unit notifies the user that the emergency notice is generated when the channel type evaluated by the evaluation unit is the CTCH, which is the emergency notice message from the base station, and notifies the user of an overview of the emergency notice when the message type evaluated by the evaluation unit is the emergency notice.

6. The mobile communication terminal according to claim 5, wherein after at least one of the emergency notice generation and the overview of the emergency notice is notified, when all of the plurality of PDUs necessary for generation of the SDU are received, the control unit notifies the user of the emergency notice message transmitted from the base station according to the generated SDU.

7. The mobile communication terminal according to claim 1, wherein after a PDU whose channel type is the CTCH, which is the emergency notice message from the base station, is received or after a PDU whose message type is the emergency notice is received among the plurality of PDUs necessary for generation of the SDU, the control unit eliminates a CTCH reception disturbing factor in the mobile communication terminal that disturbs reception of the CTCH, and preferentially performs a reception process of the PDU whose channel type is the CTCH transmitted from the base station.

8. The mobile communication terminal according to claim 7, wherein, when a timing to perform a process regarding the CTCH reception disturbing factor is same as a reception timing of the CTCH transmitted from the base station, the control unit performs control to postpone the execution timing to perform the process regarding the CTCH reception factor to a next execution timing, force to delay the execution timing to perform the process regarding the CTCH reception disturbing factor avoiding the CTCH reception timing in order not to overlap with the reception timing of the CTCH transmitted from the base station, or execute the process regarding the CTCH reception disturbing factor after receiving all of the plurality of PDUs necessary for generation of the SDU and the generation of the SDU is completed, in order to eliminate the CTCH reception disturbing factor.

9. The mobile communication terminal according to claim 8, wherein, after receiving the PDU whose channel type is the CTCH or after receiving the PDU whose message type is the emergency notice, when a timing to process monitoring of an incoming signal from the base station (Paging occasions), which is one of the CTCH reception disturbing factor, is same as a following CTCH reception timing, the control unit postpones the timing to process the monitoring of the incoming signal (Paging occasions) to a next processing timing of monitoring the incoming signal (Paging occasions), so as to perform control not to overlap with the reception timing of the PDU whose channel type is the CTCH necessary for the generation of the SDU.

10. The mobile communication terminal according to claim 8, wherein, after receiving the PDU whose channel type is the CTCH or after receiving the PDU whose message type is the emergency notice, when a timing to receive broadcast information (BCCH: Broadcast Control Channel) from the base station, which is one of the CTCH reception disturbing factor, is same as a following CTCH reception timing, the control unit postpones the reception timing of the broadcast information (BCCH) to a next reception timing of the broadcast information (BCCH), so as to perform control not to overlap with the reception timing of the PDU whose channel type is the CTCH necessary for the generation of the SDU.

11. The mobile communication terminal according to claim 8, wherein, after receiving the PDU whose channel type is the CTCH or after receiving the PDU whose message type is the emergency notice, the control unit forces a process timing of base station search (Cell search) to delay avoiding the CTCH reception timing, so that the timing to process base station search (Cell search) for selecting an optimal base station, which is one of the CTCH reception disturbing factor, will not be same as a following reception timing of the CTCH.

12. The mobile communication terminal according to claim 8, wherein, after receiving the PDU whose channel type is the CTCH or after receiving the PDU whose message type is the emergency notice, the control unit performs control to execute a process of base station reselection (Cell reselection) after receiving all of the plurality of PDU necessary for the generation of the SDU and completing the generation of the SDU, so that a timing to process the base station reselection (Cell reselection) for reselecting an optimal base station, which is one of the CTCH reception disturbing factor, will not be same as a following reception timing of the CTCH.

13. The mobile communication terminal according to claim 8, wherein, after receiving the PDU whose channel type is the CTCH or after receiving the PDU whose message type is the emergency notice, the control unit performs control to execute a process of location registration (Location registration) after receiving all of the plurality of PDUs necessary for the generation of the SDU and completing the generation of the SDU, so that a timing to process the location registration (Location registration), which is one of the CTCH reception disturbing factor, will not be same as a following reception timing of the CTCH.

14. The mobile communication terminal according to claim 8, wherein, after receiving the PDU whose channel type is the CTCH or after receiving the PDU whose message type is the emergency notice, the control unit performs control to execute a process of transmission by a user operation after receiving all of the plurality of PDUs necessary for the generation of the SDU and completing the generation of the SDU, so that a timing to process the transmission by the user operation, which is one of the CTCH reception disturbing factor, will not be same as a following reception timing of the CTCH.

15. The mobile communication terminal according to claim 14, wherein when suspending the process of transmission by the user operation until the generation of the SDU is completed, the control unit notifies it to the user.

16. The mobile communication terminal according to claim 14, wherein when the transmission by the user operation is an emergency call, even when the timing to process the transmission by the user operation is same as the following reception timing of the CTCH, the control unit does not suspend the process of the transmission by the user operation until the generation of the SDU is completed but performs it at the process timing of the transmission.

17. The mobile communication terminal according to claim 8, wherein, after receiving the PDU whose channel type is the CTCH or after receiving the PDU whose message type is the emergency notice, the control unit performs control to execute a process of powering off the mobile communication terminal after receiving all of the plurality of PDUs necessary for the generation of the SDU, generating the SDU, and notifying the user of the emergency notice message transmitted from the base station, so that a timing to process powering off the mobile communication terminal by the user operation, which is one of the CTCH reception disturbing factor, will not be same as a following reception timing of the CTCH.

18. The mobile communication terminal according to claim 17, wherein when the process of powering off the mobile communication terminal by the user operation is suspended until the emergency notice message transmitted from the base station is notified to the user according to the generated SDU, the control unit notifies it to the user.

19. The mobile communication terminal according to claim 17, wherein when the process of powering off the mobile communication terminal by the user operation is suspended until the emergency notice message is notified to the user, after the emergency notice message is notified to the user, the control unit confirms the user whether or not to perform the process of powering off the mobile communication terminal.

20. The mobile communication terminal according to claim 8, wherein, after receiving the PDU whose channel type is the CTCH or after receiving the PDU whose message type is the emergency notice, the control unit performs control to execute a process of powering off the mobile communication terminal after receiving all of the plurality of PDUs necessary for the generation of the SDU generation, generating the SDU, and notifying the user of the emergency notice message transmitted from the base station, so that a timing to process of powering off the mobile communication terminal by battery capacity drop, which is one of the CTCH reception disturbing factor, will not be same as a following reception timing of the CTCH.

21. The mobile communication terminal according to claim 20, wherein, when the process of powering off the mobile communication terminal by the battery capacity drop is suspended until the emergency notice message is notified to the user, the control unit confirms the user whether or not to perform the process of powering off the mobile communication terminal after the emergency notice message is notified to the user.

22. The mobile communication terminal according to claim 8, wherein the user can specify in advance for each factor of the CTCH reception disturbing factor whether to eliminate the CTCH reception disturbing factor that disturbs the reception of the CTCH, which is the emergency notice message from the base station, and prioritize the reception process of the CTCH or prioritize the process regarding the CTCH reception disturbing factor.

23. The mobile communication terminal according to claim 22, wherein when the user of the mobile communication terminal specifies in advance to prioritize the reception process of the CTCH for each factor of the CTCH reception disturbing factor, in regard to the CTCH reception disturbing factor, it is possible to select and specify whether, after the PDU whose channel type is the CTCH is received, to eliminate the CTCH reception disturbing factor and prioritize the reception process of the CTCH or, after the PDU whose message type is the emergency notice is received, to eliminate the CTCH reception disturbing factor and prioritize the reception process of the CTCH.

24. The mobile communication terminal according to claim 22, wherein when the user of the mobile communication terminal specifies in advance to eliminate the CTCH reception disturbing factor and prioritize the reception process of the CTCH after PDU whose message type is the emergency call is received for each factor of the CTCH reception disturbing factor, in regard to the CTCH reception disturbing factor, it is possible to select and specify whether to eliminate the CTCH reception disturbing factor and prioritize the reception process of the CTCH or to prioritize the reception process of the CTCH for each overview of the emergency call indicated by the message type.

25. An emergency notice reception method in a mobile communication terminal that operates in compliance with a wireless system of 3GPP standard, the emergency notice reception method comprising:

receiving at least one PDU (Protocol Data Unit) that is a part of a SDU (Service Data Unit) which was transmitted as a plurality of PDUs, without receiving all of the plurality of PDUs which are necessary for generation of SDU;

evaluating whether or not at least one of a channel type and a message type of the at least one received PDU is an emergency notice; and when the evaluated channel type or the message type indicates information regarding the emergency notice, notifying a user that the emergency notice is generated.

26. The emergency notice reception method according to claim 25, wherein the evaluation whether or not the channel type of the at least one received PDU is a CTCH (Common Traffic Channel) is evaluated according to a TCTF (Target Channel Type Field) on a MAC header in the PDU.

27. The emergency notice reception method according to claim 25, wherein the evaluation of whether or not the message type of the at least one received PDU is the emergency notice is evaluated according to a Message ID in a CB (Cell Broadcast) in the PDU.

28. The emergency notice reception method according to claim 25, further comprising notifying the user that the emergency notice is generated by displaying that the emergency notice is generated on a screen or sounding an alarm tone that the emergency notice is generated.

29. A non-transitory computer readable medium storing an emergency notice reception program that causes a computer to execute a step of, in a mobile communication terminal that operates in compliance with a wireless system of 3GPP standard, when receiving at least one PDU (Protocol Data Unit) that is a part of a SDU (Service Data Unit) which was transmitted as a plurality of PDUs without receiving all of the plurality of PDUs which are necessary for generation of SDU, and a channel type of the at least one received PDU is an emergency notice message from a base station, notifying a user that the emergency notice is generated.

* * * * *